United States Patent
Choi et al.

(10) Patent No.: US 11,681,430 B2
(45) Date of Patent: *Jun. 20, 2023

(54) ELECTRONIC DEVICE USING AUXILIARY INPUT DEVICE AND OPERATING METHOD THEREOF

(71) Applicant: Samsung Electronics Co., Ltd., Gyeonggi-do (KR)

(72) Inventors: Bo-Kun Choi, Seoul (KR); Jun-Suk Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,339

(22) Filed: Nov. 17, 2021

(65) Prior Publication Data

US 2022/0075494 A1 Mar. 10, 2022

Related U.S. Application Data

(63) Continuation of application No. 16/594,190, filed on Oct. 7, 2019, now Pat. No. 11,182,066, which is a continuation of application No. 15/941,392, filed on Mar. 30, 2018, now Pat. No. 10,437,458, which is a continuation of application No. 14/570,302, filed on Dec. 15, 2014, now Pat. No. 10,198,172.

(30) Foreign Application Priority Data

Dec. 18, 2013 (KR) .................. 10-2013-0158062

(51) Int. Cl.
G06F 3/0488 (2022.01)
G06F 3/041 (2006.01)
G06F 3/039 (2013.01)

(52) U.S. Cl.
CPC .......... *G06F 3/0488* (2013.01); *G06F 3/0393* (2019.05); *G06F 3/041* (2013.01)

(58) Field of Classification Search
None
See application file for complete search history.

(56) References Cited

U.S. PATENT DOCUMENTS 5,936,613 A 8/1999 Jaeger et al.
5,977,955 A 11/1999 Jaeger
5,982,355 A 11/1999 Jaeger et al.

(Continued)

FOREIGN PATENT DOCUMENTS

JP 2012-168932 A 9/2012
JP 2013-041320 A 2/2013

(Continued)

*Primary Examiner* — Amare Mengistu
*Assistant Examiner* — Sarvesh J Nadkarni
(74) *Attorney, Agent, or Firm* — Cha & Reiter, LLC

(57) ABSTRACT

An electronic device includes a display for detecting touch input, and at least one processor for recognizing a type of an auxiliary input device placed on the display. A method for utilizing the electronic device includes detecting via a touch screen a type of an auxiliary input device placed on a display based on a configuration of at least one or more conductors on the auxiliary input device, detecting an input event generated by the auxiliary input device, and executing via a processor at least one function of an executing program corresponding to the detected input event.

15 Claims, 23 Drawing Sheets

(56) References Cited

U.S. PATENT DOCUMENTS

| | | |
|---|---|---|
| 6,215,480 B1 | 4/2001 | Danis et al. |
| 6,219,035 B1 | 4/2001 | Skog |
| 6,326,956 B1 | 12/2001 | Jaeger et al. |
| 6,492,978 B1 | 12/2002 | Selig et al. |
| 6,636,197 B1 | 10/2003 | Goldenberg et al. |
| 7,116,317 B2 | 10/2006 | Gregorio et al. |
| 7,561,146 B1 | 7/2009 | Hotelling |
| 8,143,983 B1 | 3/2012 | Lauder et al. |
| 8,206,047 B1 | 6/2012 | Isaac et al. |
| 8,286,885 B1 | 10/2012 | Zehr et al. |
| 8,310,351 B2 | 11/2012 | Krahenbuhl et al. |
| 8,310,449 B1 | 11/2012 | Butikofer |
| 8,558,796 B2 | 10/2013 | Giancarlo et al. |
| 8,838,103 B2 | 9/2014 | Lee et al. |
| 9,092,931 B2 | 7/2015 | Loose et al. |
| 9,158,390 B2 | 10/2015 | Petersen |
| 9,158,422 B2 | 10/2015 | Craig et al. |
| 9,612,660 B2 | 4/2017 | Drescher et al. |
| 9,758,042 B2 | 9/2017 | Pryor |
| 9,836,142 B2 | 12/2017 | Craig et al. |
| 10,386,940 B2 * | 8/2019 | Kim ................ G06F 3/0482 |
| 2002/0024503 A1 | 2/2002 | Armstrong |
| 2003/0235452 A1 | 12/2003 | Kraus et al. |
| 2004/0056781 A1 | 3/2004 | Rix et al. |
| 2004/0060807 A1 | 4/2004 | Nishimoto et al. |
| 2004/0212598 A1 | 10/2004 | Kraus et al. |
| 2005/0164148 A1 | 7/2005 | Sinclair |
| 2006/0022956 A1 | 2/2006 | Lengeling et al. |
| 2006/0026535 A1 | 2/2006 | Hotelling et al. |
| 2006/0256090 A1 | 11/2006 | Huppi |
| 2008/0055241 A1 | 3/2008 | Goldenberg et al. |
| 2008/0211779 A1 | 9/2008 | Pryor |
| 2008/0238879 A1 | 10/2008 | Jaeger et al. |
| 2008/0276168 A1 | 11/2008 | Mansfield et al. |
| 2009/0009491 A1 | 1/2009 | Grivna |
| 2009/0141046 A1 | 6/2009 | Rathnam et al. |
| 2009/0322687 A1 | 12/2009 | Duncan et al. |
| 2010/0073486 A1 | 3/2010 | Tai |
| 2010/0097327 A1 | 4/2010 | Wadsworth |
| 2010/0245296 A1 | 9/2010 | Sip et al. |
| 2010/0265176 A1 | 10/2010 | Olsson et al. |
| 2010/0265201 A1 | 10/2010 | Oh |
| 2011/0005845 A1 | 1/2011 | Hotelling et al. |
| 2011/0216046 A1 | 9/2011 | Nishizawa |
| 2011/0248947 A1 | 10/2011 | Krahenbuhl et al. |
| 2011/0260976 A1 | 10/2011 | Larsen et al. |
| 2011/0298721 A1 * | 12/2011 | Eldridge ............... G06F 3/0362 345/173 |
| 2012/0113044 A1 | 5/2012 | Strazisar et al. |
| 2012/0162122 A1 | 6/2012 | Geaghan |
| 2012/0194457 A1 | 8/2012 | Cannon et al. |
| 2012/0218234 A1 | 8/2012 | Ferren et al. |
| 2012/0249430 A1 | 10/2012 | Oster et al. |
| 2013/0024806 A1 | 1/2013 | Funabashi et al. |
| 2013/0038549 A1 | 2/2013 | Kitada et al. |
| 2014/0042004 A1 * | 2/2014 | Tseng ................... G06F 3/0362 200/336 |
| 2014/0049475 A1 | 2/2014 | Argiro |
| 2014/0183011 A1 | 7/2014 | Park et al. |
| 2014/0215413 A1 | 7/2014 | Calkins et al. |
| 2014/0253446 A1 | 9/2014 | Petersen |
| 2014/0267118 A1 | 9/2014 | Thompson et al. |
| 2014/0282033 A1 | 9/2014 | Cannon |
| 2014/0344764 A1 | 11/2014 | Brewer |
| 2015/0121309 A1 | 4/2015 | Reed |
| 2015/0268766 A1 | 9/2015 | Kim et al. |
| 2015/0286294 A1 | 10/2015 | Kopcke et al. |
| 2015/0378480 A1 | 12/2015 | Craig et al. |
| 2016/0154479 A1 | 6/2016 | Lee |
| 2017/0016748 A1 | 1/2017 | Song et al. |
| 2017/0123520 A1 | 5/2017 | Kim et al. |
| 2017/0371474 A1 | 12/2017 | Ligameri et al. |
| 2018/0032213 A1 | 2/2018 | Touyama et al. |

FOREIGN PATENT DOCUMENTS

| | | |
|---|---|---|
| KR | 10-2004-0041509 A | 5/2004 |
| KR | 10-2012-0005257 A | 1/2012 |
| KR | 10-2012-0111197 A | 10/2012 |

* cited by examiner

ELECTRONIC DEVICE USING AUXILIARY INPUT DEVICE AND OPERATING METHOD THEREOF

CROSS REFERENCE TO RELATED APPLICATIONS

This application is a Continuation of U.S. patent application Ser. No. 16/594,190, filed on Oct. 7, 2019 which is a Continuation of the earlier U.S. patent application Ser. No. 15/941,392 filed Mar. 30, 2018 and assigned U.S. Pat. No. 10,437,458 issued on Oct. 8, 2019 which claims the benefit of the earlier U.S. patent application Ser. No. 14/570,302 filed Dec. 15, 2014 and assigned U.S. Pat. No. 10,198,172 issued on Feb. 5, 2019 which claims priority under 35 U.S.C. § 119(a) to a Korean patent application filed in the Korean Intellectual Property Office on Dec. 18, 2013 and assigned Serial No. 10-2013-0158062, the contents of which are herein incorporated by reference.

TECHNICAL FIELD

The present disclosure relates generally to an electronic device. More particularly, the present disclosure relates to an electronic device using an auxiliary input device and an operating method thereof.

BACKGROUND

In general, portable electronic devices are increasingly portable and support a variety of functions. For example, the electronic devices can perform various functions such as alarm, short messaging service, Multimedia Messaging Service (MMS), e-mail, game, short-range communication remote control, image capturing using an embedded digital camera, multimedia function for providing audio and video contents, and scheduling.

The more a portable electronic device diversifies its function, the more competitive it will be in the marketplace. For example, users generally prefer the slimmer portable electronic device with a simpler user interface capable of executing the same set of functions. Accordingly, portable electronic device manufacturers compete to develop slimmer and simpler devices relative to other products with the same or better functions.

Hence, an interface for executing and controlling the various functions of a portable electronic device is in high demand, although there is a limit to the configuration of the physical user interface for facilitating various input functions in a slim electronic device.

SUMMARY

One aspect of the present disclosure provides an electronic device using an auxiliary input device and an operating method thereof.

Various example embodiments of the present disclosure is to provide an electronic device using an auxiliary input device configured to efficiently execute a function of the electronic device at a low manufacturing cost, and an operating method thereof.

Various example embodiments of the present disclosure is to provide an electronic device using an auxiliary input device for assisting the electronic device without using a separate power supply, and an operating method thereof.

Various example embodiments of the present disclosure is to provide an electronic device using an auxiliary input device with easy manipulation and operation by excluding a complicated physical connection structure, and an operating method thereof.

In one aspect of this disclosure, a method in an electronic device is disclosed, the method including detecting via a touch screen a type of an auxiliary input device placed on a display based on a configuration of at least one or more conductors on the auxiliary input device, detecting an input event generated by the auxiliary input device, and executing via a processor at least one function of an executing program corresponding to the detected input event.

In another aspect of this disclosure, an auxiliary input device for use with an electronic device comprising is disclosed, including a cylindrical fixing body providing a rotational axis, a rotary knob mounted on the cylindrical fixing body and rotating around the rotational axis, and one or more conductors disposed on a surface of the rotary knob configured to be proximate to a touch display of the electronic device. In some variations, the auxiliary input device is sued with an electronic device, which includes the touch display for detecting touch input, and at least one processor configured to recognize a type of the auxiliary input device placed on the display based on a configuration of the conductors, detect an input event generated by the auxiliary input device, and execute a function corresponding to an executing program in response to the detected input event.

When detecting the input of the auxiliary input device, the electronic device can identify the running program and display the corresponding UI on the display.

The disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features, and advantages of certain example embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
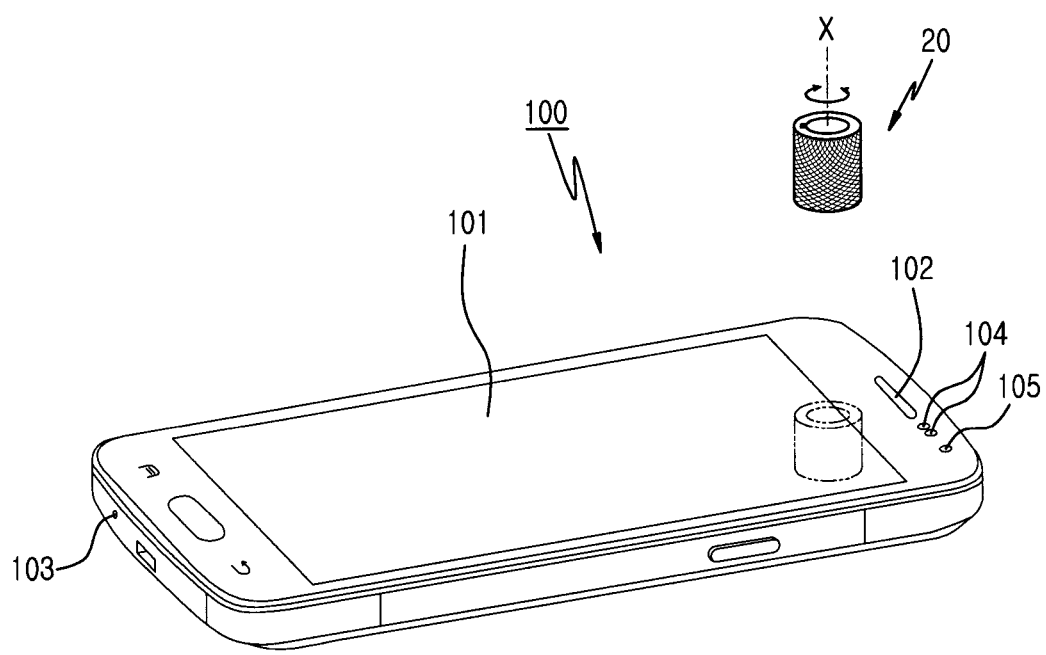
FIG. 1 is a perspective view of an electronic device using an auxiliary input device according to an example embodiment of the present disclosure.

The following description with reference to the accompanying drawings is provided to assist in a comprehensive understanding of example embodiments of the disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the ambit of the disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Example embodiments of the present disclosure provide an electronic device based on a touch screen which concurrently allows input through an input device and display through a display part on a single physical screen. Herein, the term 'display part' can be replaced by 'display'. Although the display and the input device are separated in the electronic device, the display can include the input device or the input device can be referred to as the display. Further, the display can be referred to as the touch screen (device).

The present disclosure is not limited to the electronic device including the touch screen and but applicable to various electronic devices. For example, the present disclosure can be applied to an electronic device which physically separates the display and the input device.

The present disclosure provides, but not limited to, the electronic device including the touch screen as the display and at least one camera for imaging a subject. For example, the electronic device can employ various devices including the touch screen, that is, a Personal Digital Assistant (PDA), a laptop computer, a mobile phone, a smart phone, a netbook, a Mobile Internet Device (MID), an Ultra Mobile Personal Computer (UMPC), a tablet PC, a navigation device, and an MP3 player.

The auxiliary input device employs a wheel-type input device to assist or lead an application function of the electronic device. Herein, the auxiliary input device can be referred to as an Application accessory (Appsessory).

FIG. 1 is a perspective view of an electronic device using an auxiliary input device according to an example embodiment of the present disclosure.

A display 101 is disposed on a front side of the electronic device 100, a speaker 102 for receiving other party's voice is disposed above the display 101, and a microphone 103 for sending a user's voice to the other party is disposed below the display 101. Thus, a basic communication function can be fulfilled. The display 101 can employ a touch screen for concurrently processing the input and the output in the same area.

Components for various functions of the electronic device 100 can be disposed around the speaker 102 of the electronic device 100. Such components can include a Video Telephony (VT) camera 105 for VT communication with the other party. At least one sensor module 104 can variably operate the electronic device 100 according to a surrounding environment. The sensor module 104 can include a light sensor for detecting an ambient light and automatically adjusting brightness of the display 101 according to the detected light, and/or a proximity sensor for deactivating the display 101 when detecting a head portion of the user during the call.

An auxiliary input device 20 can be disposed on the display 101. The auxiliary input device 20 can be placed on the display 101 at any location on the display area. For example, the auxiliary input device 20 can be disposed at various locations according to a running program.

Once the auxiliary input device 20 is put on the display 101, the electronic device 100 can detect and identify a type of the auxiliary input device 20, and display a corresponding User Interface (UI) on the screen or receive a corresponding input event. By merely rotating a rotary knob of the auxiliary input device 20 based on a rotation axis X, the electronic device 100 can detect the rotation and perform a corresponding function of the running program. By contrast, when the auxiliary input device 20 is detached from the display 101, the electronic device 100 may detect the separation and perform its standard functions.

Figure 2:
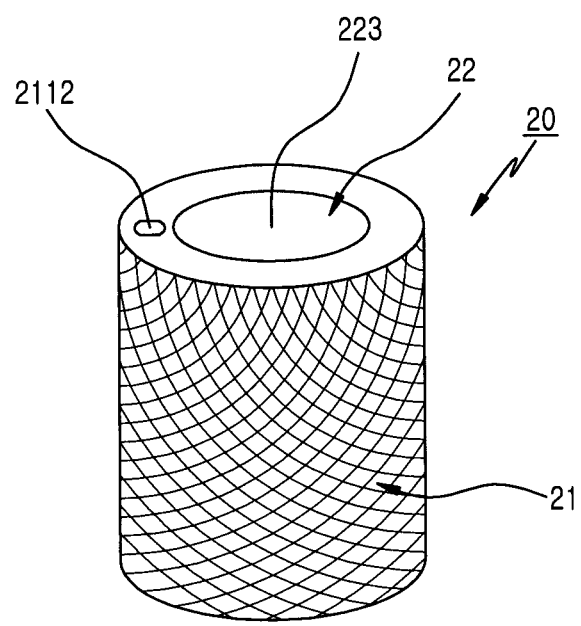
FIG. 2 is a perspective view of the auxiliary input device from above according to an example embodiment of the present disclosure.
Figure 3:
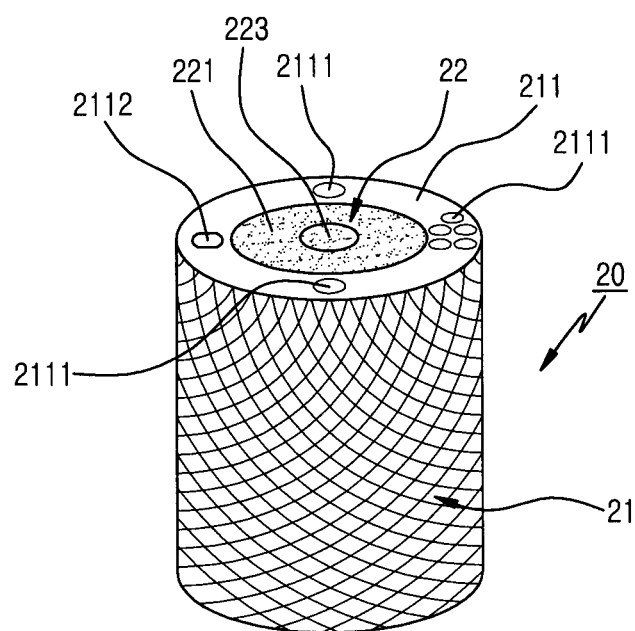
FIG. 3 is a perspective view of the auxiliary input device from below according to an example embodiment of the present disclosure.
Figure 4:
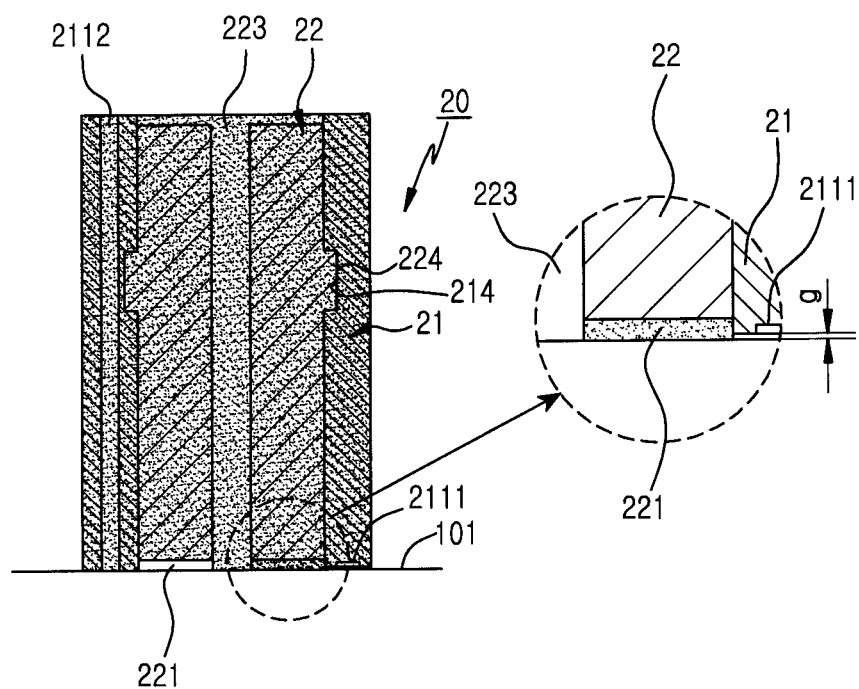
FIG. 4 is a cross-sectional view of the auxiliary input device according to an example embodiment of the present disclosure.

FIG. 2 is a perspective view of the auxiliary input device from above according to an example embodiment of the present disclosure. FIG. 3 is a perspective view of the auxiliary input device from below according to an example embodiment of the present disclosure. FIG. 4 is a cross-sectional view of the auxiliary input device according to an example embodiment of the present disclosure.

Referring to FIGS. 2, 3 and 4, the auxiliary input device 20 can be formed in a cylindrical shape. The auxiliary input device 20 can include a shaft fixing body 22 having a certain diameter, and a rotary knob 21 surrounding an outer surface of the fixing body 22. The fixing body 22 can penetrate the hollow rotary knob 21 and rotate relative to the fixing body 22.

The rotary knob 21 can be formed of, but is not limited to, an insulation material. This is to prevent an input of an incorrect function when a touch panel of the display 101 detects the metallic rotary knob 21. The rotary knob 21 may be formed of a metallic material and a portion contacting the display 101 may be formed of an insulation material. The outer surface of the rotary knob 21 may be knurled to increase friction and to facilitate manipulation.

A plurality of conductors 2111 can be disposed in a bottom side 211 of the rotary knob 21 on the surface designed to contact the display 101. The conductor 2111 is a touch area which is detected by the touch panel of the display 101. While the conductors 2111 are disposed to at particular intervals to make 7 touch areas, the conductors 2111 may be disposed in various numbers and in various structures. When the auxiliary input device 20 is put on the display 101, the electronic device 100 may recognize a touch pattern and detect the auxiliary input device 20 according to a size and the placement of the auxiliary input device 20. The display 101 may recognize multi-contact touch, recognize the touch pattern using at least one of the location, the size, or the number of the conductors 2111, and detect the placement of the auxiliary input device 20 by calculating touch coordinates.

The rotary knob 21 can further include at least one indicator 2112. The indicator 2112 may pass through the bottom surface to the top surface of the rotary knob 21, and may be exposed on the top surface. The indicator 2112 may be formed of an optical waveguiding material capable of guiding light of the display 101 to the top surface of the indicator 2112 when the auxiliary input device 20 is disposed on the display 101. For example, the indicator 2112 may be formed of an acrylic material or an optical fiber. For example, the indicator 2112 may be formed using an insert-molding process when the rotary knob 21 is manufactured.

The cylindrical fixing body 22 may be formed of a synthetic resin material. For example, the cylindrical fixing body 22 may be formed of a metallic material, and the bottom side contacting the display 101 may be formed of an insulation material. For example, a fixing pad 221 of great friction such as rubber or silicon may be attached to the bottom side of the fixing body 22 to maximize the friction when the auxiliary input device 20 is disposed on the display 101. For example, when the auxiliary input device 20 is disposed on the display 101, the fixing body 22 may be fixed onto the display 101 and the rotary knob 21 may rotate clockwise or counterclockwise based on the fixing body 22.

The cylindrical fixing body 22 may include a conductive shaft 223 which vertically penetrates the center of the cylindrical fixing body 22. An upper region of the conductive shaft 223 may be relatively wider than a lower region. The upper region of the conductive shaft 223 may be exposed through the top side of the auxiliary input device 20, and the lower region may contact the surface of the display 101. The lower region of the conductive shaft 223 may be formed in an area that is designed to not be detected by the touch display, even when it contacts the display 101. The conductive shaft 223 may thus be detected by the electronic device 100 when the user simultaneously touches the upper region.

The rotary knob 21 and the fixing body 22 may be assembled to rotate together. For example, an inner surface of the rotary knob 21 may include, but is not limited to, a recess 214, and an outer surface of the fixing body 22 may include, but is not limited to, a projection 224 to be received in the recess 214. Various coupling structures for rotating the rotary knob 21 without leaving the fixing body 22 may be applied.

When the auxiliary input device 20 is placed on the display 101 of the electronic device 100, the fixing body 22 may be secured by the fixing pad 221 so it does not move relative to the display 101; the rotary knob 21 thus rotates relative to the fixing body 22. To facilitate this rotation, the bottom surface of the rotary knob 21 may be coated with a material for minimizing the friction between the bottom surface of the rotary knob 21 and the touch screen. For example, a bottom end of the rotary knob 21 may be disposed higher than a bottom end of the fixing body 22, resulting in less or no contact with the touch screen. However, a height difference "g" between the rotary knob 21 and the fixing body 22 should be in a range where the electronic device 100 is still capable of detecting the conductor 2111 of the rotary knob 21.

For example, when the auxiliary input device 20 is disposed on the display 101 of the electronic device 100, the electronic device 100 may sense the auxiliary input device 20 on the display 101 including information such as at least one of the pattern, the size, or the number of the conductors 2111 disposed below the rotary knob 21. For example, the electronic device 100 may display a UI corresponding to the detected auxiliary input device 20 according to a presently executing program. For example, the electronic device 100 may display a UI on the display 101 so that the user can intuitively perceive the function of the auxiliary input device 20. For example, when the user rotates the rotary knob 21 clockwise or counterclockwise, the electronic device 100 may perform the corresponding function by detecting the movement of the conductors of the rotary knob 21 on the touch screen. For example, when the user touches the top of the fixing body 22, the electronic device 100 may perform the corresponding function by recognizing the touch as a "soft touch button" or software-based button. For example, the electronic device 100 may perform a corresponding function based on detection of a rotation speed of the rotary knob 21.

Figure 5:
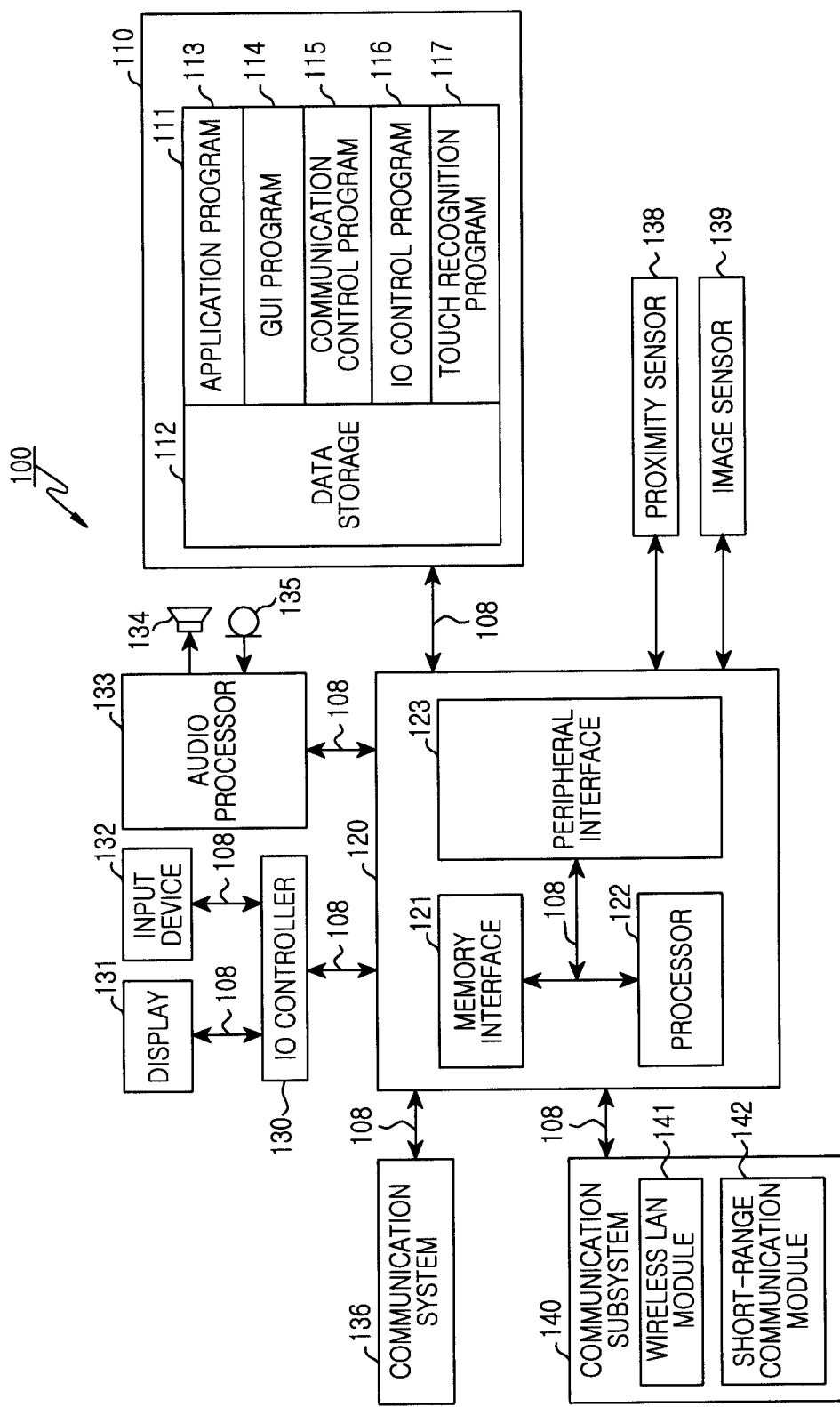
FIG. 5 is a block diagram of the electronic device according to an example embodiment of the present disclosure.

FIG. 5 is a block diagram of the electronic device according to an example embodiment of the present disclosure.

Referring now to FIG. 5, the electronic device 100 can include a memory 110, a processor unit 120, an Input Output (IO) controller 130, a display 131, an input device 132, an audio processor 133, a communication system 136, and a communication subsystem 140. These components can communicate with each other through one or more communication buses or signal lines 108.

The memory 110 includes a program storage 111 for storing a program to control operations of the electronic device 100, and a data storage 112 for storing data generating in the program execution. The memory 110 can store data generated by the program in a processor 122.

For example, the data storage 112 may include database information used for the processor 122 to determine relevant programs executed by a touch recognition control program 117, and setup information utilized to configure Graphic User Interface (GUI) when the display 131 displays the related programs. For example, the data storage 112 may store various function information of the auxiliary input device 20 according to the corresponding program. For example, the function information may have a different mapping value according to the corresponding program. For example, the data storage 112 may map and store the function information of an application program installed to the electronic device 100 and the function information of the auxiliary input device 20.

The program storage 111 may include an application program 113, a GUI program 114, a communication control program 115, an IO control program 116, the touch recognition control program 117, and an auxiliary input device operating program 118. Herein, the program contained in the program storage 111 may be referred as an instruction set which is a set of instructions.

The application program 113 may include at least one software component for at least one application program installed in the electronic device 100.

The GUI may 114 can include at least one software component for providing the GUI on the display 131. For example, the GUI program 114 may control to display application program information driven by the processor 122 on the display 131.

The communication control program 115 may include at least one software component for controlling communication with one or more other electronic devices using the communication system 136 and/or the communication subsystem 140. For example, the communication control program 115 may discover other electronic device to communicate. Upon discovering the other electronic device to communicate, the communication control program 115 can establish the connection to communicate with the other electronic device.

The 10 control program 116 may display the operation of the electronic device 100 on the display 131, and receive an operation command of the electronic device 100 from the outside through the input device 132. Although it is not depicted, the input device 132 may include the auxiliary input device 20. When detecting no running application program and sensing the auxiliary input device 20, the electronic device 100 may control to assist a default input function of the system.

The touch recognition control program 117 may move, store, magnify, or demagnify image information displayed on the display according to the touch input under the control of the processor 122. The touch recognition control program 117 may recognize the plurality of the conductors of the rotary knob 21 of the auxiliary input device 20, as the touch area. When the rotary knob 21 of the auxiliary input device 20 rotates, the touch recognition control program 117 may detect the movement of the touch area of the conductors disposed below and provide its information to the processor 122 so as to perform the corresponding function of the running application program.

The electronic device 100 may include one or more memories 110. According to a purpose, the memory 110 may function as the program storage 111, the data storage 112, or both. A physical internal area of the memory 110 may not be distinctly divided according to device characteristics.

The processor unit 120 can include a memory interface 121, at least one processor 122, and a peripheral interface 123. Herein, the memory interface 121, the at least one processor 122, and the peripheral interface 123 of the processor unit 120 may be integrated onto at least one integrated circuit or implemented using separate components.

The memory interface 121 may control access of the component such as processor 122 or peripheral interface 123, to the memory 110.

The peripheral interface 123 may control the connection between an input/output peripheral of the electronic device 100 and the processor 122 and the memory interface 121.

The processor 122 controls the electronic device 100 to provide various multimedia and communication services using at least one software program, to display the IO controller 130 to display the GUI of the electronic device on the display 131, and to forward the command input from the outside of the electronic device 100, to the input device 132. In so doing, the processor 122 may execute at least one program stored in the memory 110 and control to provide the service according to the corresponding program.

The processor 122 may identify the running program according to the auxiliary input device 20 placed on the display 101 of the electronic device 100, and provide the input function corresponding to the program. The processor 122 may control to display the input function of auxiliary input device 20, on the display 131. The processor 122 may receive from the touch recognition control program 117 the touch information according to the rotation of the rotary knob, and control to perform the corresponding function of the running program.

The audio processor 133 may provide an audio interface between the user and the electronic device 100 through the speaker 134 and the microphone 135. The audio processor 133 may output the input of the auxiliary input device 20 and its related output information, as voice under the control of the processor 122.

The communication system 136 may connect the electronic device 100 to an external device using one or more antennas under the control of the processor 122. The communication system 136 sends/receives radio signals for voice call, video call, Short Messaging Service (SMS), Multimedia Messaging Service (MMS), and data communication to and from a terminal such as smart phone of a phone number input to the electronic device 100, a tablet PC, or other portable device.

The communication subsystem 140 may include a wireless Local Area Network (LAN) module 141 and a short-range communication module 142. The wireless LAN module 141 may wirelessly access Internet via an Access Point (AP) under the control of the processor 122.

The IO controller 130 may provide an interface between an IO device such as display 131 and input device 132, and the peripheral interface 123.

The input device 132 may provide input data generated by a user's selection to the processor unit 120 through the IO processor 130. For example, the input device 132 may include a control button for controlling the electronic device 100. For example, the input device 132 may include a keypad for receiving the input data from the user. For example, the input device 132 can include the auxiliary input device 20.

The display 131 displays status information of the electronic device 100, a character input by the user, a moving picture, and a still picture, which are received from the processor unit 120, through the IO processor 130. For example, when the auxiliary input device 20 is detected under the control of the processor 122, the display 131 may display the input function corresponding to the running program in relation to the auxiliary input device 20. When the auxiliary input device 20 cannot perform the input function of the running program under the control of the processor 122, the display 131 may display its related information.

A proximity sensor 138 may detect proximity of the subject in a certain distance from the electronic device 100 and provide detection information to the processor 122. An image sensor 139, which is a component of the camera 1023, may capture the subject in a guide area under the control of the processor 122.

FIGS. 6A through 6D depict the auxiliary input device according to an example embodiment of the present disclosure, in which a web browsing service program is executed and the corresponding screen is displayed based on a web address.

Figure 6A:
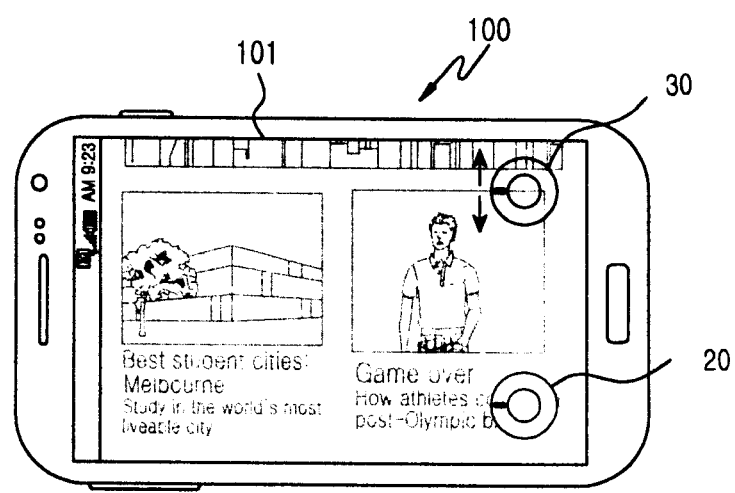
FIG. 6A, FIG. 6B, FIG. 6C, and FIG. 6D are diagrams of the auxiliary input device according to an example embodiment of the present disclosure.

Referring to FIG. 6A, when the webpage is displayed and the auxiliary input device 20 is output on a display 101 of the electronic device 100, the corresponding UI 30 may be displayed. The displayed UI 30 may or may not correspond in some fashion to the auxiliary input device 20 in shape. An indicator 30 of the auxiliary input device 20 may be displayed in the UI. The auxiliary input device 20 may be used to scroll the displayed webpage screen. Hence, the displayed UI may display an object indicator 30 to help the user intuitively perceive the scroll function as executed via the auxiliary input device 20.

Figure 6B:
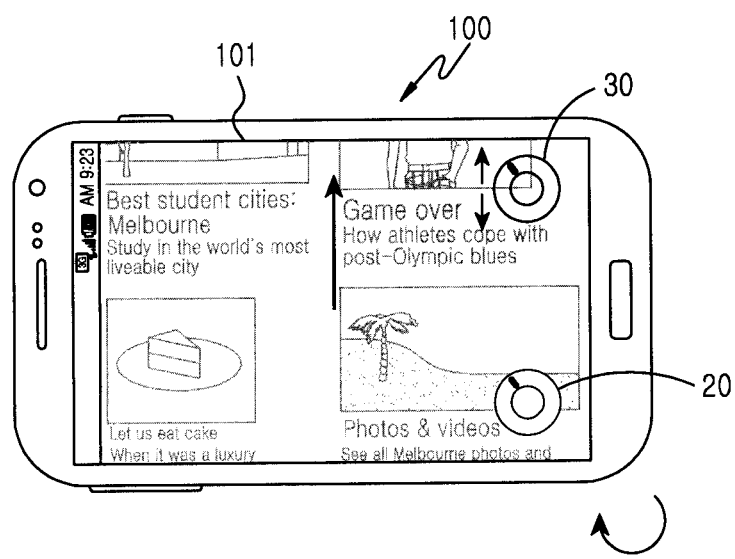

Referring to FIG. 6B, when the rotary knob of the auxiliary input device 20 is rotated clockwise, the indicator of the UI 30 is also moved to the corresponding location and concurrently the displayed webpage can be scrolled up.

Figure 6C:
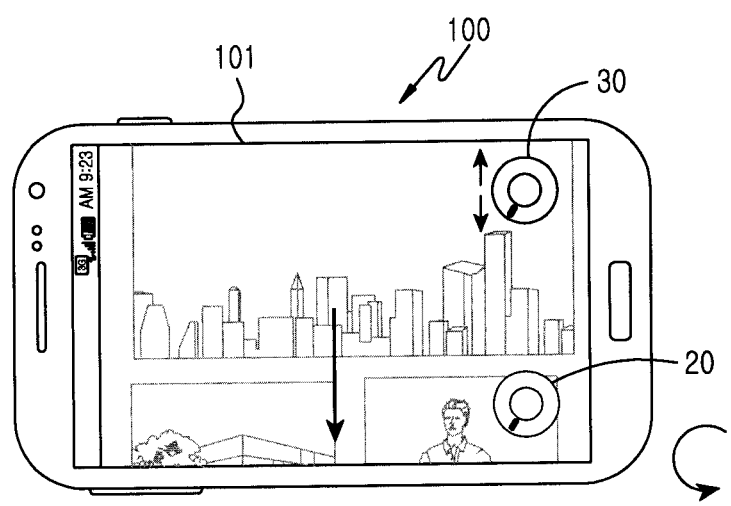

Referring to FIG. 6C, when the rotary knob of the auxiliary input device 20 is rotated counterclockwise, the indicator of the UI 30 is also moved to the corresponding location and concurrently the displayed webpage can be scrolled down.

Other functions can be executed according to the rotation of the auxiliary input device 20. For example, based on the rotation of the rotary knob of the auxiliary input device 20, the webpage can be switched.

Various functions such as bookmark and settings may be provided by touching a conductive shaft 223 that is disposed on a fixing body 22.

When the auxiliary input device 20 is disposed on the display 101, the electronic device 100 may in some embodiments display the UI 30 away from the auxiliary input device 20. For example, a UI 31 may be displayed around the disposition of the auxiliary input device 20 on the display 101, as shown in FIG. 6D.

Figure 6D:
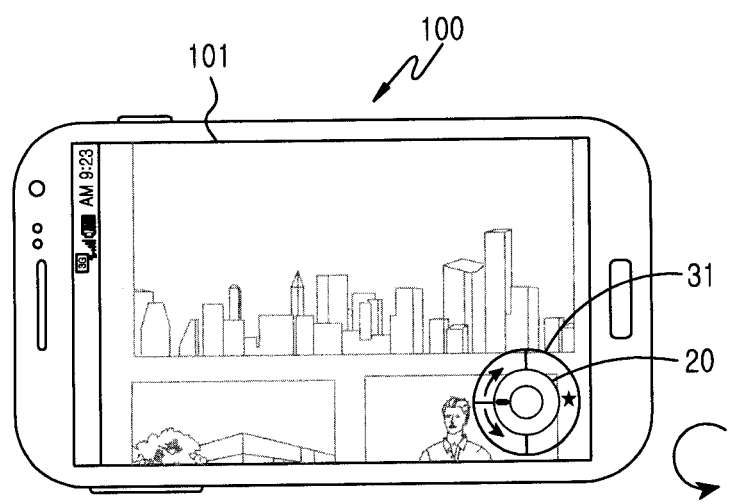

Referring to FIG. 6D, when the auxiliary input device 20 is disposed on the display 101, the electronic device 100 may detect the placement of the auxiliary input device 20, and display the UI 31 around the auxiliary input device 20. For example, for a circular auxiliary input device 20, the UI 31 may display as a circle having a concentric circle surrounding the auxiliary input device 20 and having a wider area than the auxiliary input device 20. The UI 31 may vary according to the operation of the auxiliary input device 20. In this case, since the the auxiliary input device 20 is proximate to the UI 31, the UI 31 may not display another display object corresponding to the indicator, as disclosed in other embodiments above. The UI 31 may include up and down arrow objects for scrolling through the web screen of the current web browsing service. The UI may further include a bookmark object for storing the current webpage as a favorite webpage. Hence, the user may be guided by the objects displayed in the UI 31 and perform the corresponding input by rotating the rotary knob of the auxiliary input device 20 or touching the conductive shaft 223.

The electronic device can detect the placement of the auxiliary input device on the display, and display the UI corresponding to the running program on the display, although a UI need not always be displayed. The electronic device may also provide notification information to the user using auditory output or tactile output based on the rotation of the rotary knob. The electronic device may output the notification information corresponding to the rotation of the rotary knob to the user using voice or sound through the speaker, and vibration through a vibrator or a haptic sensor. The electronic device may display the UI corresponding to the auxiliary input device and concurrently output the auditory or tactile notification information corresponding to the rotation of the rotary knob.

FIGS. 7A through 7D depict control of multimedia playback in a multimedia program according to an example embodiment of the present disclosure.

Figure 7A:
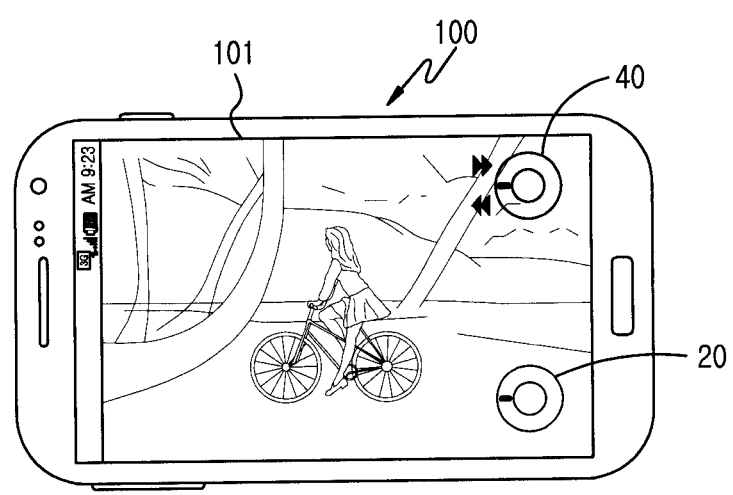
FIG. 7A, FIG. 7B, FIG. 7C, and FIG. 7D are diagrams of the auxiliary input device according to an example embodiment of the present disclosure.

Referring to FIG. 7A, when the playback screen is displayed and the auxiliary input device 20 is disposed on the display 101 of the electronic device 100, a corresponding UI 40 can be displayed. The displayed UI 40 may be the same as or different from the auxiliary input device 20 in shape. The indicator of the auxiliary input device 20 may be displayed in the UI. The auxiliary input device 20 may provide a function for changing the play time. Hence, the displayed UI may display an object for the user to intuitively perceive the play time selection function.

Figure 7B:
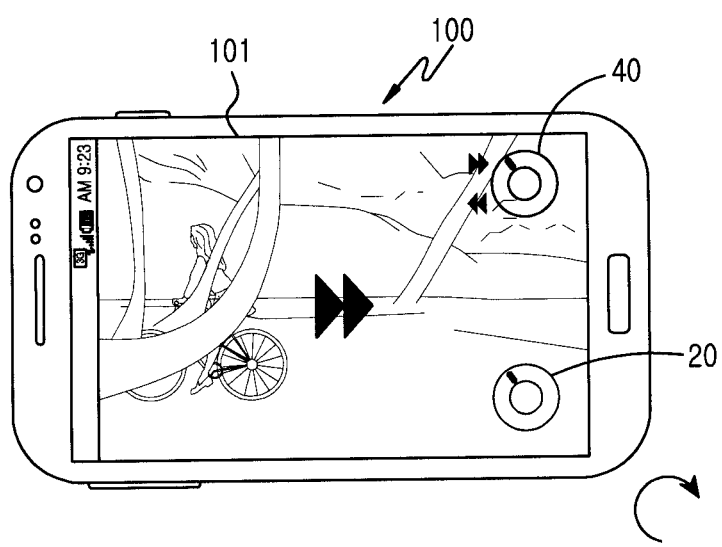

Referring to FIG. 7B, when the rotary knob of the auxiliary input device 20 is rotated clockwise, the indicator of the UI may also be moved to the corresponding playback location, and concurrently, the current playback time can be changed to a fast forwarded play time corresponding to the selected playback location.

Figure 7C:
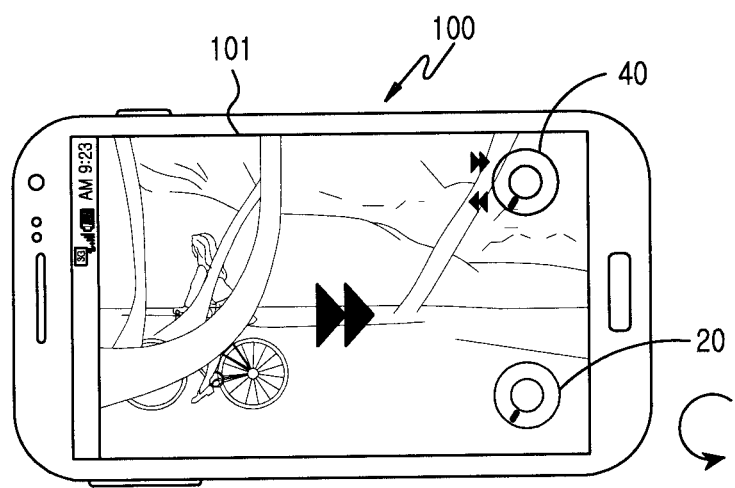

Referring to FIG. 7C, when the rotary knob of the auxiliary input device 20 is rotated counterclockwise, the indicator of the UI may also be moved to the corresponding playback location and concurrently the current play time can be changed to a rewound playback time corresponding to the selected playback location.

Figure 7D:
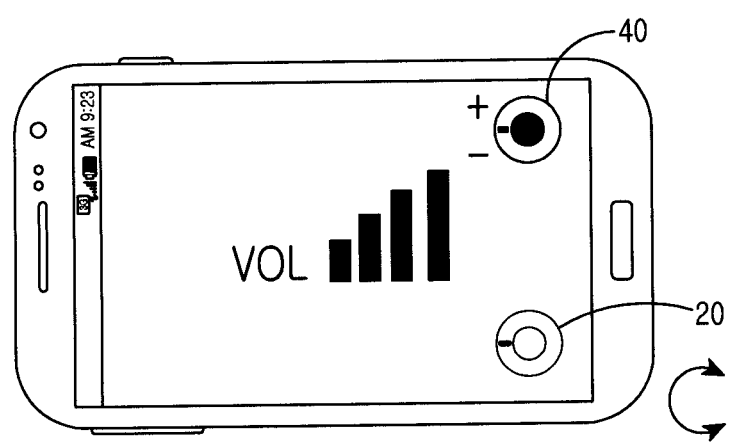

Referring to FIG. 7D, when the multimedia is played and the conductive shaft 223 of the auxiliary input device 20 is touched, a mode can be changed. The touch can include at least one of tap touch, double click touch, or long press touch. When a particular touch is applied, the rotary knob is rotated. Thus, the mode may be switched from playback control to a volume control function of the played multimedia, a jog shuttle function for continuously controlling the screen search or the play speed, or an edit function, etc.

Figure 8A:
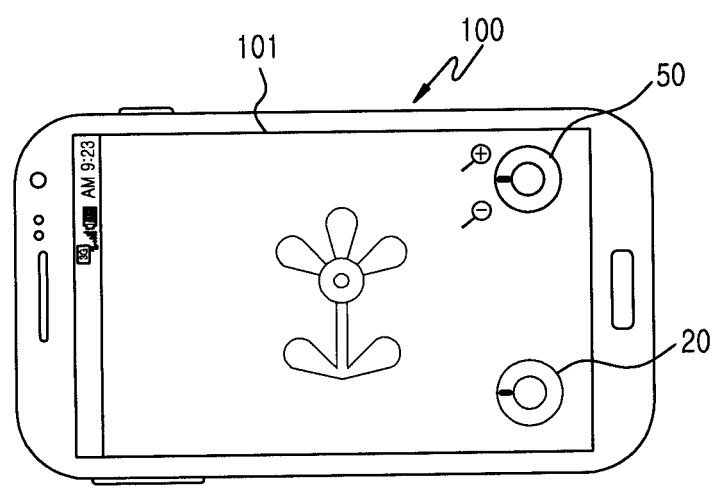
FIG. 8A, FIG. 8B, and FIG. 8C are diagrams of the auxiliary input device according to an example embodiment of the present disclosure.
Figure 8B:
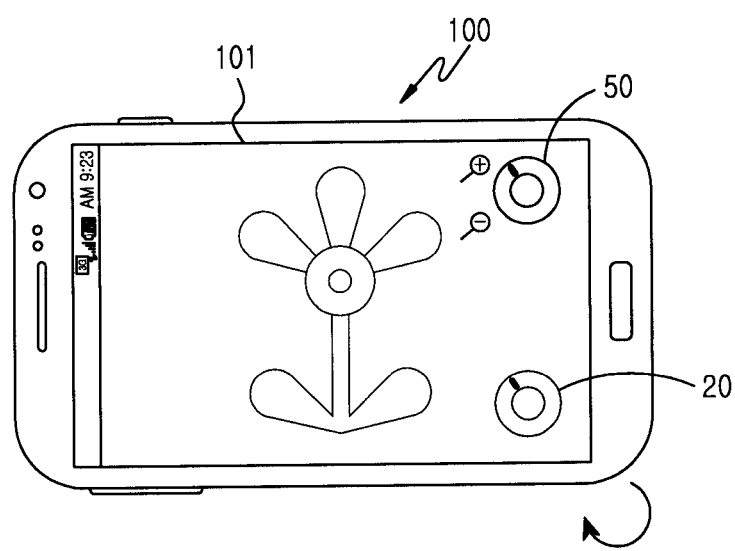
Figure 8C:
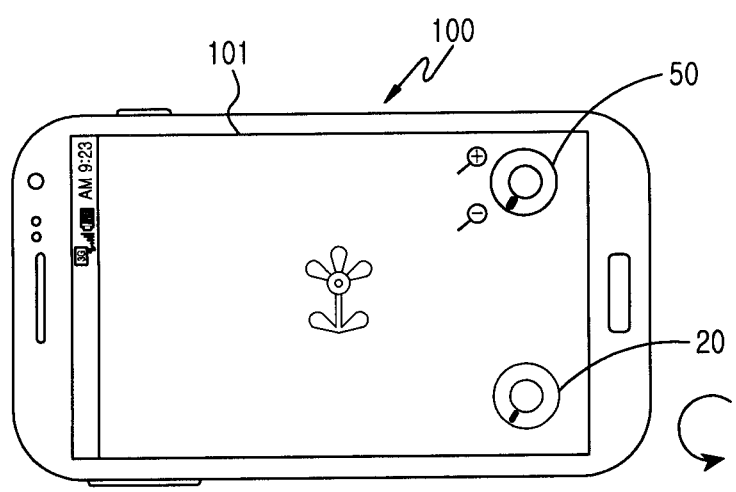

FIGS. 8A, 8B, and 8C depict image display in an image viewer program according to an example embodiment of the present disclosure.

Referring to FIG. 8A, when an image is displayed and the auxiliary input device 20 is disposed on the display 101 of the electronic device 100, a corresponding UI 50 can be displayed. The displayed UI 50 can be the same as or different from the auxiliary input device 20 in shape. The indicator of the auxiliary input device 20 can thus be displayed in the UI. In one embodiment of the present disclosure, the auxiliary input device 20 can magnify and demagnify the image. Hence, the displayed UI may display an object for the user to intuitively perceive image magnification and demagnification.

Referring to FIG. 8B, when the rotary knob of the auxiliary input device 20 is rotated clockwise, the indicator of the UI 50 is also moved to the corresponding location and concurrently the current image can be magnified.

Referring to FIG. 8C, when the rotary knob of the auxiliary input device 20 is rotated counterclockwise, the indicator of the UI 50 is also moved to the corresponding location and concurrently the current image can be demagnified.

The touch on the conductive shaft 223 of the fixing body may switch the auxiliary input device 20 to a different control function. For example, various functions may include entering a browsing mode, searching the image in the browsing mode, or storing a particular image to a temporary folder.

Figure 9A:
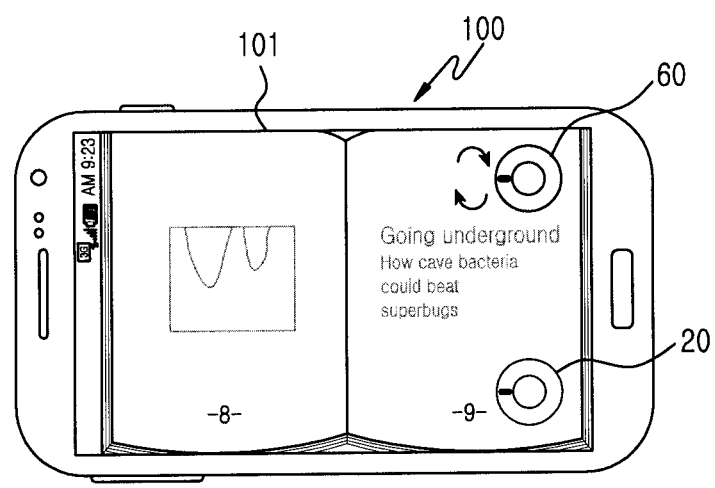
FIG. 9A, FIG. 9B, and FIG. 9C are diagrams of the auxiliary input device according to an example embodiment of the present disclosure.
Figure 9B:
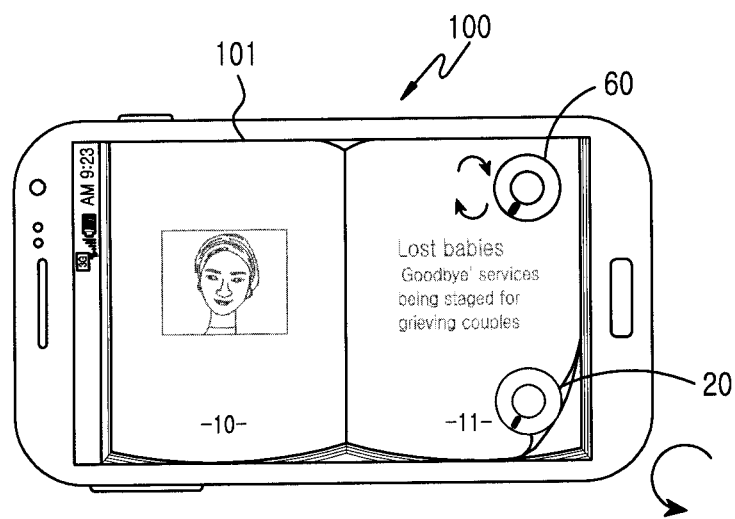
Figure 9C:
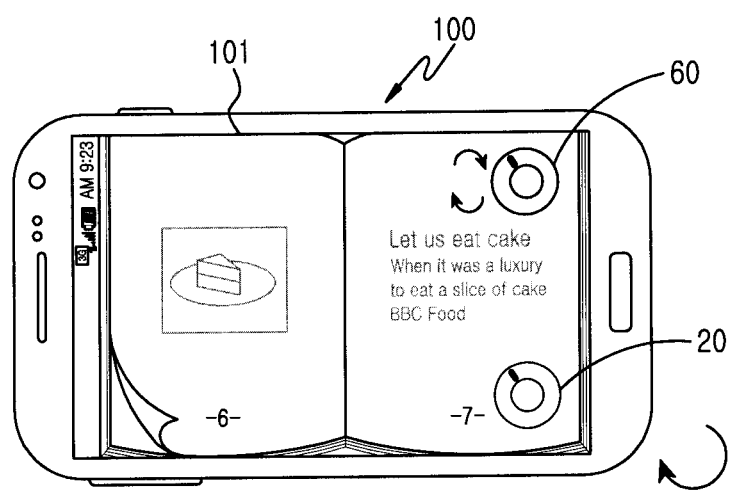

FIGS. 9A, 9B, and 9C depict an e-book displayed in an e-book viewer program according to an example embodiment of the present disclosure.

Referring to FIG. 9A, when an e-book is displayed and the auxiliary input device 20 is put on the display 101 of the electronic device 100, a corresponding UI 60 can be displayed. The displayed UI 60 may be the same as or different from the auxiliary input device 20 in shape. The indicator of the auxiliary input device 60 may be displayed in the UI. The auxiliary input device 20 may be used to change pages within the e-book. Hence, the displayed UI can display an object allowing the user to intuitively control and perceive the e-book page changes.

Referring to FIG. 9B, when the rotary knob of the auxiliary input device 20 is rotated counterclockwise, the indicator of the UI 60 may also be moved to the corresponding location and concurrently the current e-book page can be turned to a next page.

Referring to FIG. 9C, when the rotary knob of the auxiliary input device 20 is rotated clockwise, the indicator of the UI 60 may also be moved to the corresponding location and concurrently the current e-book page can be turned to a previous page.

The touch on the conductive shaft 223 of the fixing body can be switch to activate a different function. For example, various functions executable by touch inputs made to the conductive shaft 223 may include the bookmark function, a dog ear function, a preview function, a chapter jump function, and an edit function.

Figure 10A:
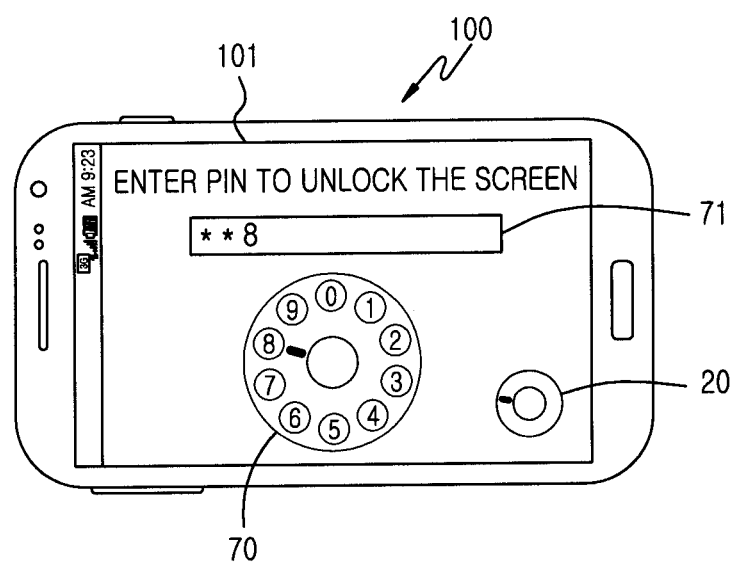
FIG. 10A and FIG. 10B are diagrams of the auxiliary input device according to an example embodiment of the present disclosure.
Figure 10B:
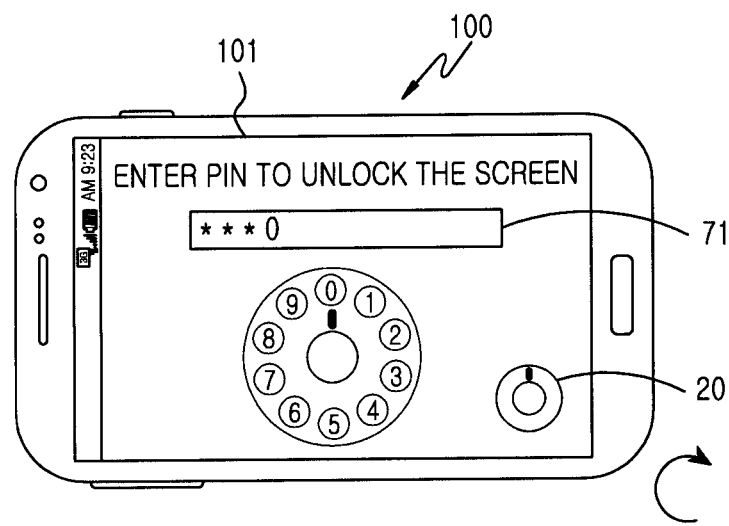

FIGS. 10A and 10B depict a dial-type input object displayed in a lock program according to an example embodiment of the present disclosure.

Referring to FIG. 10A, when the lock program is executed and the auxiliary input device 20 is disposed on the display 101 of the electronic device 100, a corresponding UI 70 can be displayed. The displayed UI 70 may be a dial-type object. The auxiliary input device 60 may be used to select a digit or a character in the dial-type UI 70. The auxiliary input device 20 may be utilized to enter a password in a password input window 71. The dial-type UI 70 may also display the corresponding indicator according to the rotation of the rotary knob. When the user touches the conductive shaft 223 at the corresponding location, the digit corresponding to the current indicator can be entered into the password input window.

Referring to FIG. 10B, when the rotary knob of the auxiliary input device 20 is rotated, the indicator may be placed at a different location, and then, as the control panel is manipulated, the corresponding digit or character may be entered to the password input window. The user may release the lock by sequentially entering the digit corresponding to the password input window 71 according to touch tapping the control panel, and then applying a touch click or the long press touch to the control panel.

The electronic device 100 may also recognize the auxiliary input device 20 and make a call using the dial-type object as the UI.

When a game program is executed, the electronic device 100 may control the movements and actions of a game object displayed on the display 101 using the auxiliary input device 20.

When a broadcasting program is executed, the electronic device 100 may provide various functions for controlling a current broadcasting screen using the auxiliary input device 20. For example, the electronic device 100 may performs various functions such as channel switch, volume control, a channel information search, and link, during the broadcasting screen output using the auxiliary input device 20.

Figure 11:
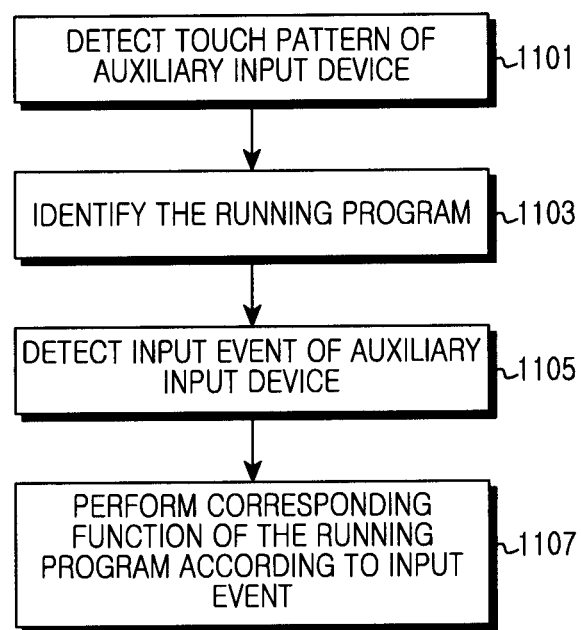
FIG. 11 is a flowchart of a method for operating the auxiliary input device of the electronic device according to an example embodiment of the present disclosure.

FIG. 11 is a flowchart of a method for operating the auxiliary input device of the electronic device according to an example embodiment of the present disclosure.

Referring to FIG. 11, the electronic device can identify the type of the auxiliary input device by detecting the touch pattern of the auxiliary input device in step 1101. The electronic device can detect the auxiliary input device on the display, identify the type of the auxiliary input device, and determine whether the auxiliary input device is available for the input.

In step 1103, the electronic device may identify an executing program. The electronic device can identify the executing program, and display the UI relating to the corresponding program on the display. When there is no executing program, the electronic device may display the UI relating to the default function of the system. When there is neither the executing program nor the default function of the system, the electronic device may output the notification information indicating the auxiliary input device is not available for use presently. The notification information can include at least one of the auditory output through the speaker, the visual output on the display, or the tactile output using the vibrator.

Next, the electronic device can determine whether the input event of the auxiliary input device occurs in step 1105, and perform the corresponding function of the running program according to the input event in step 1107. The electronic device can determine whether the function corresponding to the running program is conducted. The electronic device can determine whether the rotary knob of the auxiliary input device is rotated or whether the control panel of the fixing body is touched. The electronic device can detect the movement of the touch pattern below the rotary knob and thus perform the function corresponding to the running program. The electronic device can detect the touch input of the touch panel of the fixing body and thus perform the function corresponding to the running program. The touch input detected through the control panel may include at least one of the tap touch, the double click touch, or the long press touch.

Figure 12:
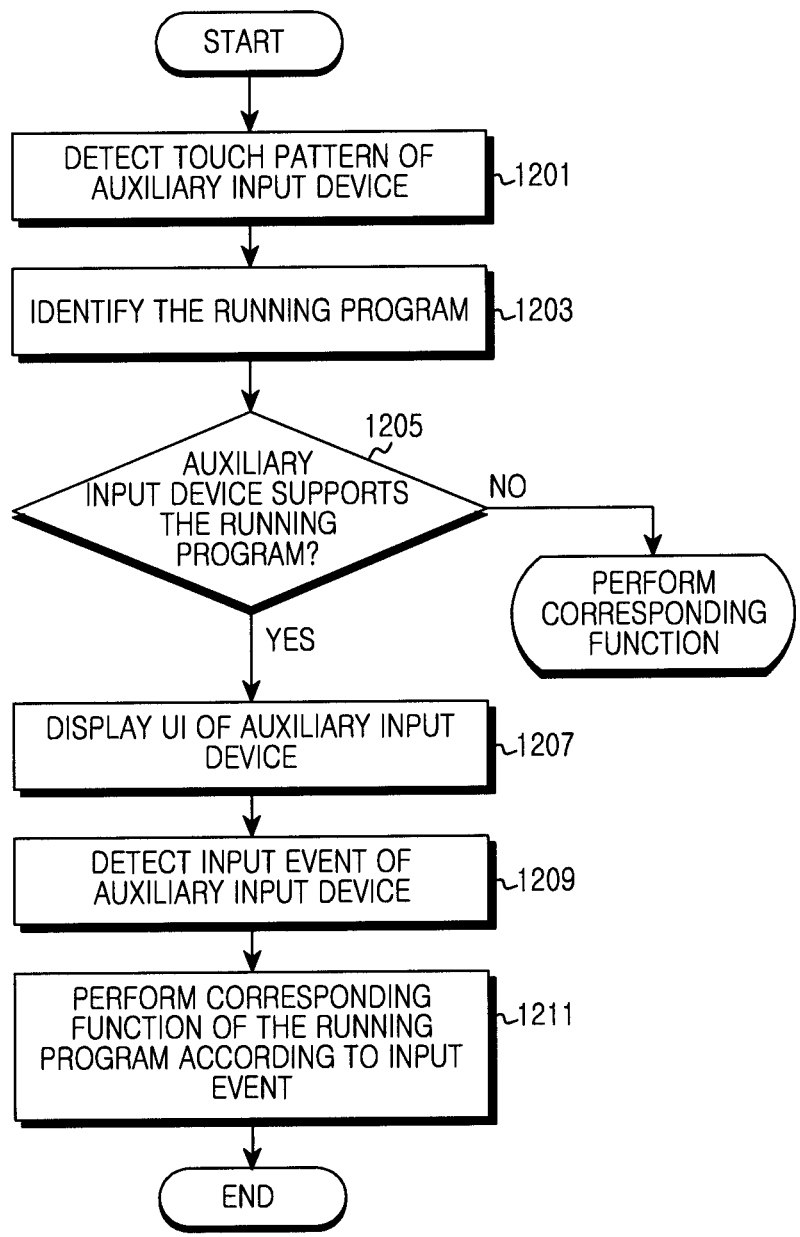
FIG. 12 is a flowchart of a method for operating the auxiliary input device of the electronic device according to an example embodiment of the present disclosure.

FIG. 12 is a flowchart of a method for operating the auxiliary input device of the electronic device according to an example embodiment of the present disclosure.

Referring to FIG. 12, the electronic device can detect the touch pattern of the auxiliary input device in step 1201. The electronic device can detect the auxiliary input device on the display, identify the type of the auxiliary input device, and determine whether the auxiliary input device is available for the input.

In step 1203, the electronic device can identify the executing program. In step 1205, the electronic device can determine whether the auxiliary input device supports the executing program.

When the auxiliary input device supports the executing program, the electronic device may display the UI of the auxiliary input device on the display in step 1207. The electronic device may display the UI relating to the corresponding executing program on the display.

When the auxiliary input device does not support the running program in step 1205, the electronic device can output the notification information indicating the auxiliary input device is unavailable for use. The notification information executing include at least one of the auditory output through the speaker, the visual output on the display, or the tactile output using the vibrator.

Next, the electronic device executing determine whether the input event of the auxiliary input device occurs in step 1209, and perform the corresponding function of the executing program according to the input event in step 1211. The electronic device executing determine whether the function corresponding to the executing program was implemented. The electronic device executing determine whether the rotary knob of the auxiliary input device is rotated or the control panel of the fixing body is touched. The electronic device executing detect the movement of the touch pattern below the rotary knob and thus perform the function corresponding to the running program. The electronic device executing detect the touch input of the control panel of the fixing body and thus perform the function corresponding to the running program. The touch input detected through the control panel executing include at least one of the tap touch, the double click touch, or the long press touch.

The fixing body may include two or more control panels of the auxiliary input device.

The rotary knob of the auxiliary input device may include two or more indicators at intervals.

The methods as described in the claims and/or the specification of example embodiments of the present disclosure can be implemented using hardware, software, or a combination of them.

As for the software, a computer-readable storage medium including one or more programs (software modules) can be provided. One or more programs stored in the computer-readable storage medium can be configured for execution by one or more processors of the electronic device. One or more programs include instructions for controlling the electronic device to execute the methods according to the example embodiments as described in the claims and/or the specification of the present disclosure.

Such a program (software module, software) can be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs can be stored to a memory combining part or all of those recording media. A plurality of memories can be equipped.

The programs can be stored in an attachable storage device accessible via a communication network such as Internet, Intranet, Local Area Network (LAN), Wide LAN (WLAN), or Storage Area Network (SAN), or a communication network by combining these networks. The storage device can access the present electronic device through an external port. A separate storage device may access the present electronic device over a communication network.

As set forth above, the auxiliary input device can reduce the manufacturing cost without having to use a separate power supply, and achieve the simplified manipulation and the enhanced usage by providing the intuitive dynamic input method to the user.

While the disclosure has been shown and described with reference to certain example embodiments thereof, it will be understood by those skilled in the art that various changes in form and details may be made therein without departing from the ambit of the disclosure as defined by the appended claims and their equivalents.

What is claimed is:

1. A non-transitory computer readable medium comprising instructions, which, when executed by an electronic device, cause the electronic device to perform operations comprising:
    detecting that a rotatable auxiliary input device is positioned on a touch screen of the electronic device, the rotatable auxiliary input device configured to detect a rotational input,
    in response to detecting the rotatable auxiliary input device, identifying whether a first application supporting the rotatable auxiliary input device is being executed;
    in case that the first application being executed supports the rotatable auxiliary input device, displaying a first user interface associated with the rotatable auxiliary input device and the first application; and
    in case that the first application being executed does not support the rotatable auxiliary input device, displaying a default user interface associated with the rotatable auxiliary input device and an operating system of the electronic device.

2. The computer readable medium of claim 1, wherein the instructions further cause the electronic device to perform operations comprising:
    displaying the default user interface in case that no applications are being executed and the operating system is executing.

3. The computer readable medium of claim 1, wherein the instructions further cause the electronic device to perform operations comprising:
    displaying the first user interface to surround the rotatable auxiliary input device.

4. The computer readable medium of claim 1, wherein the instructions further cause the electronic device to perform operations comprising:
    displaying the first user interface before a first rotational input is received from the rotatable auxiliary input device.

5. The computer readable medium of claim 1, wherein the instructions further cause the electronic device to perform operations comprising:
    receiving a first rotational input from the rotatable auxiliary input device, and
    controlling a first operation of the first application based on the first rotational input.

6. The computer readable medium of claim 5, wherein the first application is used for playing back media, and
    wherein the first operation of the first application comprises adjusting an audio volume of the media based on the first rotational input.

7. The computer readable medium of claim 5, wherein the instructions further cause the electronic device to perform operations comprising:
    performing the first operation of the first application based on a rotation direction of the first rotational input and/or a rotation speed of the first rotational input.

8. A non-transitory computer readable medium having a computer program stored thereon, which, when executed by an electronic device, cause the electronic device to:
    detect that a rotatable auxiliary input device is positioned on a touch screen of the electronic device, the rotatable auxiliary input device configured to detect a rotational input,
    in response to detecting the rotatable auxiliary input device, identify whether a first application supporting the rotatable auxiliary input device is being executed;
    in case that the first application #s-being executed supports the rotatable auxiliary input
    device, display a first user interface associated with the rotatable auxiliary input device and the first application; and
    in case that the first application being executed does not support the rotatable auxiliary input device, display a default user interface associated with the rotatable auxiliary input device and an operating system of the electronic device.

9. The computer readable medium of claim 8, wherein the computer program is stored in the non-transitory computer readable medium in a server and wherein the computer program is downloaded over a network to the electronic device.

10. The computer readable medium of claim 8, wherein the computer program further causes the electronic device to perform operations comprising:
   displaying the default user interface in case that no applications are being executed and the operating system is executing.

11. The computer readable medium of claim 8, wherein the computer program further causes the electronic device to perform operations comprising:
   displaying the first user interface to surround the rotatable auxiliary input device.

12. The computer readable medium of claim 8, wherein the computer program further causes the electronic device to perform operations comprising:
   displaying the first user interface before a first rotational input is received from the rotatable auxiliary input device.

13. The computer readable medium of claim 8, wherein the computer program further causes the electronic device to perform operations comprising:
   receiving a first rotational input from the rotatable auxiliary input device, and
   controlling a first operation of the first application based on the first rotational input.

14. The computer readable medium of claim 13, wherein the first application is used for playing back media, and
   wherein the first operation of the first application comprises adjusting an audio volume of the media based on the first rotational input.

15. The computer readable medium of claim 13, wherein the computer program further causes the electronic device to perform operations comprising:
   performing the first operation of the first application based on a rotation direction of the first rotational input and/or a rotation speed of the first rotational input.

\* \* \* \* \*